United States Patent [19]

Peterson et al.

[11] 4,309,041

[45] Jan. 5, 1982

[54] MACHINE TOOL COLLET

[75] Inventors: Anders A. Peterson, Elmira; William J. Cummiskey, Horseheads, both of N.Y.

[73] Assignee: Hardinge Brothers, Inc., Elmira, N.Y.

[21] Appl. No.: 74,725

[22] Filed: Sep. 12, 1979

[51] Int. Cl.³ .............................................. B23B 31/20
[52] U.S. Cl. ................................. 279/1 ME; 279/1 Q; 279/55
[58] Field of Search ............... 279/1 ME, 1 Q, 55, 56, 279/57, 58, 59

[56] References Cited

U.S. PATENT DOCUMENTS

| Re. 24,903 | 12/1960 | Smith | 279/58 |
| 3,217,519 | 11/1965 | Demler | 279/57 X |
| 3,889,962 | 6/1975 | Parsons | 279/46 |

Primary Examiner—Z. R. Bilinsky
Attorney, Agent, or Firm—Shlesinger, Arkwright, Garvey and Dinsmore

[57] ABSTRACT

A machine tool collet having a generally cylindrical body with a longitudinal axis. The collet is divided into a plurality of segments each having front and rear surfaces and endfaces with recesses. The recesses hold biasing springs which force each segment away from the adjacent segment.

4 Claims, 7 Drawing Figures

MACHINE TOOL COLLET

BACKGROUND OF THE INVENTION

The present invention relates generally to a machine tool collet. In particular to a collet for holding lathe stock in alignment on a lathe machine.

During machining, the work stock has a tendency to move with respect to the longitudinal axis of the stock. This movement is both circular and axial and is determined by the cut being made. Another factor involved, is that long bar or rod stock is often used as the work stock. The bar or rod is fed through the collet so as to enable the lathe to work on different areas of the work stock.

There have been a variety of collets made for this purpose however they have inherent weaknesses. If the collets were made to grip the work stock with the force necessary to keep the stock from moving, the collet would not release the work stock fast enough to permit proper feed out. The collets would also have a tendency to stick to the stock and not release. If the collets were made to release fast, there would be insufficient grip to immobilize the work stock. Additionally, the collets would have short life times as they would wear out. In order to increase the useful life of collets they are hardened. However, in some cases, this causes them to be brittle and fracture prematurely.

OBJECTS OF THE INVENTION

Accordingly it is an object of this invention to provide a collet with a fast release time yet having sufficient holding ability.

It is an additional object of this invention to provide a collet with increased life.

It is a further object of this invention to provide a collet with sufficient holding strength so as not to mar the work stock.

Still another object of this invention is to provide a collet with replaceable parts.

Another object of the invention is to provide a collet that can be configured for different shaped work stock.

Yet another object of this invention is to provide a collet which is self sealing thus preventing chips, dirt, etc. from becoming lodged in between the sections of the collet.

Still a further object of this invention is to provide a collet which has a soft center and case hardened outer surface to resist wear and fatigue.

These and other objects of this invention will be apparent from the following description and claims.

DESCRIPTION OF THE DRAWINGS

FIGS. 1 AND 2

Figure 1:
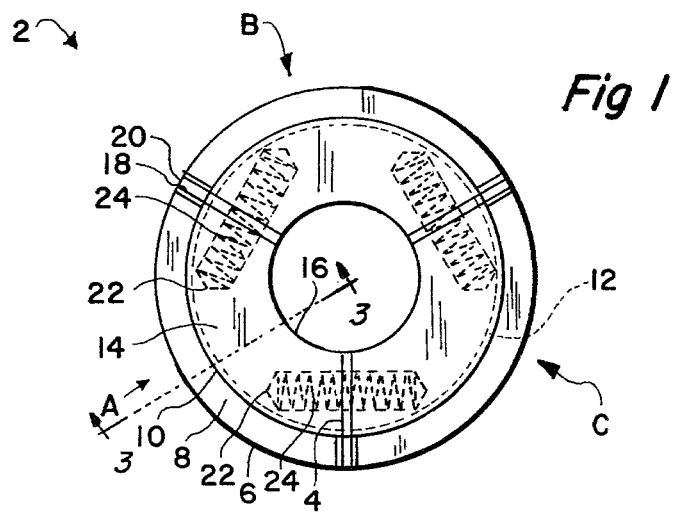
FIG. 1 is a front end elevation view of the machine collet showing in phantom lines the biasing springs.
Figure 2:
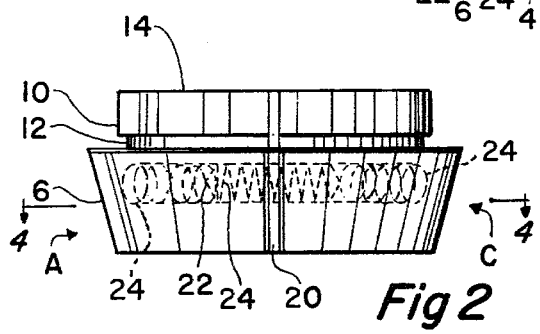
FIG. 2 is a side elevation view of the collet showing the junction of two of the collet sections with the biasing springs in phantom lines.

As best shown in FIG. 1, the collet 2 is made up of three identical sections A, B and C. Section A, for example, has an end surface 4 and a bearing surface 6. At the top of bearing surface 6 a shoulder 8 is provided and connected to the reduced diameter surface 10 by a relief 12 as shown in FIG. 2.

Collet section A has a top surface 14 and an inner surface 16. The other end surface 18 has bonded to it a resilient seal 20. The holes 22 in the end surfaces 4 and 18 serve to retain biasing springs 24.

As sections A, B and C are identical, the description of A will suffice for B and C.

FIG. 3

Figure 3:
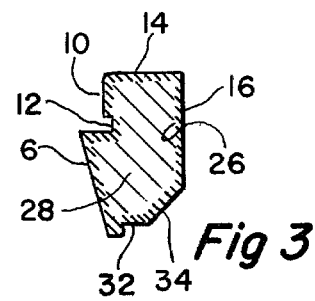
FIG. 3 is a cross sectional view along lines 3—3 of FIG. 1 and viewed in the direction of the arrows and showing the case hardened surfaces of the collet.

FIG. 3 shows a cross section of the segment A detailing the case hardened area 26 of segment A. The center material 28 is of a soft non-hardened metal or the like. As shown in FIG. 3, the entire surface area of the segment is case hardened.

FIGS. 4, 5 AND 6

Figure 4:
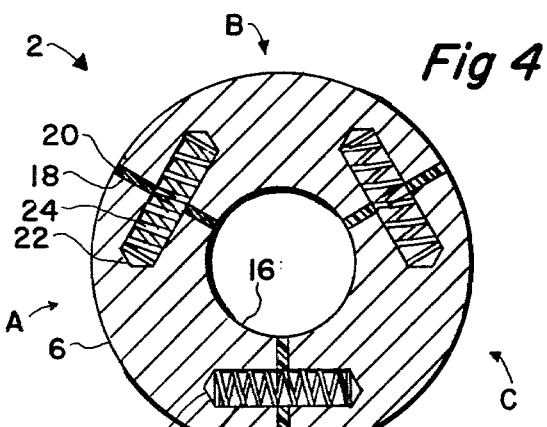
FIG. 4 is a cross sectional view along lines 4—4 of FIG. 2 and viewed in the direction of the arrows, showing in detail the spring biasing arrangement and the sealing means between the sections of the collet.

As shown in FIG. 4, the springs 24 are compressed when the collet is in use. In this position, the resilient seals 20 serve to join and seal the end surfaces of segments A, B and C. The seals 20 conform to the end surfaces 4 and 18.

Figure 5:
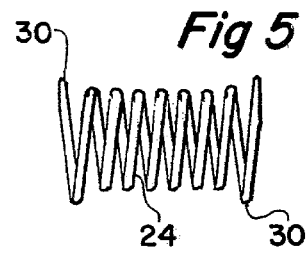
FIG. 5 is an enlarged side elevational view of one of the biasing springs showing the expanded ends.

In FIG. 5, one of the biasing springs 24 is shown with the enlarged ends 30. These enlarged ends serve to retain the spring in holes 22 in segments A, B and C.

Figure 6:
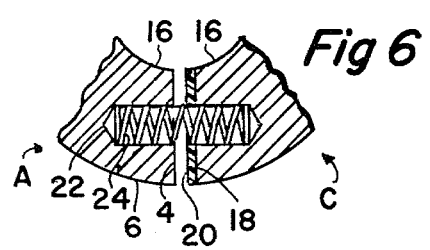
FIG. 6 is an enlarged fragmentary cross sectional view of the junction between two of the collet sections showing them in open, relaxed position.

As best shown in FIG. 6, when the collet is not being used the biasing springs 24 force the segments, A, B and C, apart. In this position, a gap is formed between the surface 4 of segment A and the resilient seals 20.

FIG. 7

Figure 7:
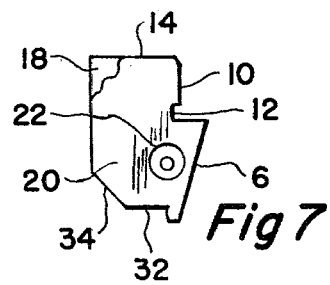
FIG. 7 is an end view of one of the collet sections showing in detail the mounting hole for the spring. The seal at top left is broken away for clarity.

In FIG. 7 the end surface 18 of segment C has the resilient seal 20 bonded thereto. The hole 22 serves as the mounting location for the biasing springs 24. The bottom of segments A, B and C has a surface step 32 and an angle 34.

OPERATION

The operation of the machine tool collet is as follows:

The work stock is inserted through the hole created by the inner surfaces 16 of sections A, B and C. When the collet is compressed as shown in FIG. 1, the inner surfaces 16 of the three sections A, B and C grip the outer surface of the work stock (not shown). This prevents the work stock from moving so that accurate machining can be performed.

As best shown in FIG. 6, seals 20 are mounted on biasing springs 24 and serve to force the sections A, B and C apart. This is necessary because when the closing sleeve pressure is applied to the collet bearing surfaces 6, the collet closes onto the work stock with great force. There is a tendency for the collet's outer surfaces 6 to stick to the inner surface of the closing sleeve. When sticking occurs, the work stock does not feed out and slows down the machining process. As such, additional cost is incurred both in personnel time and machining time.

Additional opening force results from the expanding of the resilient seals 20 which may be made of some oil resistant material such as neoprene, etc. When the collet is in the closed position, the seals 20 are highly compressed. This enables the seals to fill the gap between the ends surfaces 4 of sections A, B and C. Thus preventing chips, dirt or other materials from interfering with the closing of the collet. Because the seals 20 are resilient, they return to their original shape. This causes the seals 20 to expand and add additional force to separate the collet sections A, B and C.

As shown in FIG. 7, the holes 22 are machined into the end surfaces 4 and 18 of the segments A, B and C. The holes 22 are positioned close to the bearing surface 6, and generally within one sixteenth of an inch from the edge of the bearing surface 6. This enables the biasing springs 24 to exert the maximum force to separate the collet sections A, B and C.

As best shown in FIG. 5, the biasing springs 24 have enlarged ends 30. These enlarged ends 30 are forced into holes 22 to prevent the springs 24 from coming out of the holes 22. This prevents the collet sections A, B and C from separating unintentionally when the collet is removed from the machine or is in the relaxed or non-loaded position.

As shown in FIG. 3 all the outside surfaces of the collet 2 are hardened. This hardening greatly slows down the wear on the collet 2 surfaces. As such, useful life of the collet 2 is greatly extended. This hardening is approximately one sixteenth inch.* This depth was shown to be the most satisfactory degree of hardening. If more of the collet 2 is hardened,* the collet 2 would become brittle and develop surface fractures prematurely. As the surface fractures weaken the collet 2, it must be replaced.

*The distance inwardly from the surface.

Should one or more sections A, B or C of the collet 2 need replacement, the biasing springs 24 can be forced from the holes 22 permitting replacement of the sections A, B or C. The resilient seals 20 are bonded to one end face 18 of the sections A, B and C. When one or more sections of the collet 2 are replaced, the seals on that section are also replaced and bonded to that one end surface 18.

It should be noted that although the inner surfaces 16 of sections A, B and C are shown in circular configuration, they could be changed to form a square, hex or other shape in order to match the stock in use.

As best shown in FIG. 2, the bearing surface 6 of sections A, B and C are canted. This produces a wedge effect when the collet 2 is closed by a closing sleeve. This wedge effect increases the pressure exerted by the inner surfaces 16 of segments A, B and C on the outer surface of the work stock.

Although in FIG. 3 the entire outside surfaces of the collet 2 are shown as being hardened, it should be understood that just the inner surface 16 and the bearing surfaces 6 of segments A, B and C need to be hardened.

While this invention has been described as having a preferred design, it will be understood that it is capable of further modification. This application, is therefore, intended to cover any variations, uses, or adaptations of the invention following the general principles thereof and including such departures from the present disclosure as come within known or customary practice in the art to which this invention pertains, and may be applied to the essential features hereinbefore set forth and fall within the scope of this invention or the limits of the claims.

What is claimed is:
1. A machine tool collet including:
   (a) a body having a longitudinal axis
   (b) said body having front and rear faces
   (c) a plurality of radial slots extending parallel to said axis dividing said body into a plurality of cooperating segments having first and second end faces
   (d) said segments each having an outer surface including inner and outer areas
   (e) said inner surface area including a work support surface
   (f) said outer surface area including a bearing support surface
   (g) said bearing support surface and said work support surface being case hardened
   (h) said first and second end faces each having an annular spring receiving hole substantially transverse to its respective face
   (i) said holes ending at least 1/16 inch short of said bearing support surface
   (j) said hole of said first end face of one segment being aligned with said hole of said second end face of an adjacent segment to form an aligned pair of holes
   (k) a coil spring mounted in and extending between each pair of said aligned holes and joining said segments together to form said body
   (l) each of said segments having resilient seal means having an opening cooperating with said aligned pair of holes and mounted on said coil spring received in said cooperating aligned holes
   (m) each of said seal means being bonded to its respective first end face only and said seal means unbonded to said adjacent second end face whereby said segments may be readily separated one from the other without damaging said seals
   (n) said coil springs including a relaxed position maintaining said first end faces of each segment a substantial distance from said second end faces of a cooperating segment and said seals secured to said first end faces being out of engagement with said second end faces of said adjacent segments, and said coil springs including a compressed position maintaining said first end faces of each of said segments in close proximity to said second end faces of its cooperating segment and said seals secured to said first end faces being in engagement with said second end faces of said adjacent segments
   (o) said first and second faces being non-case hardened, and
   (p) said seals having a thickness substantially less than the distance between said first and second end faces when said coils are in said relaxed position.
2. A machine tool collet as in claim 1 wherein:
   (a) said bearing support surface and said work support surface being hardened to a depth of approximately one sixteenth inwardly from said surfaces.
3. A machine tool collet as in claim 1 and wherein:
   (a) said coil springs include hole gripping means.
4. A machine tool collet as in claim 3 and wherein:
   (a) said coil springs hole gripping means are expanded ends.

* * * * *